US010698746B1

(12) United States Patent
Giango et al.

(10) Patent No.: US 10,698,746 B1
(45) Date of Patent: Jun. 30, 2020

(54) SYSTEMS, METHODS AND COMPUTER PROGRAM PRODUCTS FOR CONTROLLING A FIELD DEVICE

(71) Applicant: Yokogawa Electric Corporation, Tokyo (JP)

(72) Inventors: Mamerto Perez Giango, Singapore (SG); Sin Wai Chan, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/418,589

(22) Filed: May 21, 2019

(51) Int. Cl.
   *G06F 3/00* (2006.01)
   *G06F 9/44* (2018.01)
   *G06F 9/46* (2006.01)
   *G06F 13/00* (2006.01)
   *G06F 9/54* (2006.01)
   *G06F 3/0484* (2013.01)

(52) U.S. Cl.
   CPC .......... *G06F 9/541* (2013.01); *G06F 3/04847* (2013.01); *G06F 9/546* (2013.01)

(58) Field of Classification Search
   CPC .................................................... G06F 9/541
   USPC ........................................................ 719/328
   See application file for complete search history.

(56) References Cited

U.S. PATENT DOCUMENTS

2005/0071851 A1* 3/2005 Opheim ................ G06F 8/65
                                                          719/321
2008/0320402 A1* 12/2008 Isenmann .......... G05B 19/4083
                                                          715/762
2015/0106826 A1* 4/2015 Hahniche ............ H04L 41/0253
                                                          719/321
2015/0113423 A1* 4/2015 Giango ................ G06F 3/0484
                                                          715/740

* cited by examiner

Primary Examiner — Timothy A Mudrick
(74) Attorney, Agent, or Firm — Sughrue Mion, PLLC

(57) ABSTRACT

The invention enables a device type manager (DTM) to implement through a field device tool (FDT) frame application, field device management capabilities that are outside the defined operating capabilities of the FDT frame application. The enables controlling a field device, through a device type manager (DTM) configured to control a field device based on control instructions received from a field device tool (FDT) frame application. The FDT frame application and the DTM and/or a DTM wrapper within the DTM may be implemented based on a first runtime environment and a first set of specifications that defines a first set of operating capabilities for the FDT frame application. The DTM wrapper may be configured to communicate with the FDT frame application based on one or more messaging protocols defined by the first set of specifications and further to communicate through inter-process communication, with (i) a DTM framework controller configured to implement the communication and control instructions that enable the DTM to communicate with or control the field device, wherein the DTM framework controller is configured for implementation based on a second runtime environment that is different from the first runtime environment, and (ii) a DTM user interface controller configured to implement one or more user interface controls for controlling the field device.

17 Claims, 7 Drawing Sheets

SYSTEMS, METHODS AND COMPUTER PROGRAM PRODUCTS FOR CONTROLLING A FIELD DEVICE

FIELD OF THE INVENTION

The invention relates to the domain of management of field devices for automation technology, based on a field device tool (FDT) frame application, and device type managers (DTMs). In particular, the invention provides systems, methods and computer program products that enable a FDT frame application to implement through a device type manager (DTM), field device management capabilities that are outside the defined operating capabilities of the FDT frame application.

BACKGROUND

Automation technology routinely uses field devices for monitoring, registering and controlling process parameters within the automation environment/industrial environment. Exemplary field devices may operate as sensors, for example, fill level measuring devices, mass flow measuring devices, pressure- and temperature-measuring devices, pH- and redox-potential-measuring devices, conductivity measuring devices, etc. for process automation technology. Such devices operate as sensors that detect and report on the corresponding environment parameters such as, fill level, flow, e.g. flow rate, pressure, temperature, pH-value and conductivity value, respectively. Other types of field devices may operate as actuators that enable control of process parameters, e.g. valves, which control flow of a liquid in a section of pipeline, or pumps, which change fill level in a container etc.

Field devices are typically communicatively coupled with application programs that can be used for process control, process visualization, device-management (configuration and servicing) and for plant management (asset management). The communicative coupling may be achieved by communication systems or protocols such as PRO FIBUS®, FOUNDATION-FIELDBUS®, HART®, etc.

The integration of field devices into application programs occurs through defined device descriptions that are provided by device manufacturers, so that the application programs as well as other devices communicating with field devices can recognize and interpret the meaning of data supplied by the field devices.

A specific type of device description is the Device Type Manager (DTM) description, which corresponds to Field Device Tool (FDT) specifications. The FDT specifications, serving as an industry standard, have been developed by the PNO (Profibus Nutzer Organisation (Profibus User Organization)) in cooperation with ZVEI (Zentralverband Elektrotechnik-und Elektroindustrie).

Field device manufacturers develop and distribute DTMs for their field devices based on defined device descriptions such as the FDT specification—which DTMs encapsulate all variables and functions of the pertinent field device and offer, most often, a graphical user interface for servicing the devices.

The DTMs require an FDT compatible frame application (FDT frame application)—which enable an operator to monitor and control the corresponding field device through an interface generated or controlled by the FDT frame application. The FDT frame application and the corresponding DTMs together enable access to field devices (e.g. to device parameters, measured values, diagnostic information, status information, etc.), as well as for invoking special functions, which individual DTMs make available.

DTMs typically correspond to one of two types of DTM—device DTMs for field devices, and communication DTMs for field communication control. In implementation, the DTMs are device objects, which, together with the FDT frame application, represent an object-oriented configuration system for field devices of automation technology.

Since FDT specifications are updated from time to time, later versions of FDT specifications offer operating capabilities for the FDT frame application that are not offered by or supported by earlier versions of the FDT specifications. For example, while the FDT specification version 1.2.x requires implementation through older technology (Microsoft COM) and can at most only use Microsoft .NET 3.5 software framework, the subsequent FDT specification versions 2.x use the Microsoft .NET 4.x software framework.

Additionally, even current versions of FDT specifications do not support rich content within the user interface display—for example through implementation of Hyper Text Markup Language (HTML) capabilities—as a result of which, such capabilities are not implemented within either current or earlier FDT frame applications There is accordingly a need for enabling existing FDT frame applications to implement user interface capabilities that may not be provided within the current or earlier FDT specifications.

Another consequence arising out of the changing capabilities of incrementally developed FDT specifications is that many automation environments already have FDT frame applications that are configured according to an earlier FDT specification—and such FDT frame applications are unable to benefit from the improved capabilities of the subsequently developed FDT specifications. Since replacement or upgrading the FDT frame application is a time and resource intensive procedure, entities are typically unwilling to make the change on a frequent basis—and as a result there is a need to ensure that FDT frame applications that have been developed based on an earlier FDT specification are able to implement the advanced capabilities of later FDT specifications.

SUMMARY

The invention provides systems, methods and computer program products that enable a device type manager (DTM) to implement through a field device tool (FDT) frame application, field device management capabilities that are outside the defined operating capabilities of the FDT frame application.

In an embodiment, the invention provides a system for controlling a field device, comprising a processor, a device type manager (DTM) configured to control a field device based on control instructions received from a field device tool (FDT) frame application and a processor implemented field device tool (FDT) frame application, configured for receiving data from the field device through the DTM, and for transmitting control instructions to the DTM for controlling the field device.

The FDT frame application may be configured for implementation based on a first runtime environment, and based on a first set of specifications that defines a first set of operating capabilities for the FDT frame application.

i. The DTM may comprise a DTM wrapper—wherein the DTM wrapper is configured for implementation based on the first runtime environment, to communicate with the FDT frame application based on one or more messaging protocols defined by the first set of specifications and further to communicate through inter-process communication, with (i) a DTM framework controller configured to implement the communication and control instructions that enable the DTM to communicate with or control the field device, wherein the DTM framework controller is configured for implementation based on a second runtime environment that is different from the first runtime environment, and (ii) a DTM user interface controller configured to implement one or more user interface controls for controlling the field device.

The DTM user interface controller may be configured for implementation based on the second runtime environment, and based on a second set of specifications that defines a second set of operating capabilities for the FDT frame application, wherein the second set of operating capabilities for the FDT frame application is different from the first set of operating capabilities for the FDT frame application.

The DTM may additionally be configured to communicate with the FDT frame application, to enable through the FDT frame application, display of the one or more user interface controls implemented by the DTM user interface controller.

The DTM wrapper may be configured to communicate to one or both of the DTM user interface controller and the DTM framework controller, one or more user initiated instructions corresponding to the one or more user interface controls that are implemented by the DTM user interface controller and displayed through the FDT frame application.

In an embodiment, the DTM wrapper may be configured to receive from the DTM user interface controller, a pointer to a memory address at which the DTM user interface controller has stored display data corresponding to the one or more user interface controls for controlling the field device, wherein the said one or more user interface controls have been generated by the user interface controller that is operating within the second runtime environment, and are received by the DTM wrapper that is operating within the first runtime environment.

The DTM wrapper may be configured to transmit to the FDT frame application, the stored display data retrieved from the memory address, for display on a display device.

In one embodiment, the second set of operating capabilities for the FDT frame application includes one or more operating capabilities that are not included in the first set of operating capabilities for the FDT frame application.

In a system embodiment, the second runtime environment is configured to support one or more Hyper Text Markup Language (HTML) controls that are not supported by the first runtime environment.

The DTM user interface controller is in one embodiment implemented within a process instantiated by the DTM framework controller.

The DTM user interface controller may be instantiated by the DTM framework controller in response to the DTM wrapper requesting the DTM framework controller for display data corresponding to the one or more user interface controls for controlling the field device.

The invention additionally presents a method for controlling a field device, through a processor implemented system comprising (i) a device type manager (DTM) configured to control a field device based on control instructions received from a field device tool (FDT) frame application, and (ii) field device tool (FDT) frame application, configured for receiving data from the field device through the DTM, and for transmitting control instructions to the DTM for controlling the field device. The method comprises implementing at DTM wrapper within the DTM, the steps of (i) communicating through inter-process communication, with a DTM framework controller configured to implement the communication and control instructions that enable the DTM to communicate with or control the field device, and (ii) communicating through inter-process communication with a DTM user interface controller configured to implement one or more user interface controls for controlling the field device.

The FDT frame application may be implemented based on a first runtime environment, and based on a first set of specifications that defines a first set of operating capabilities for the FDT frame application. The DTM wrapper may be implemented based on the first runtime environment, and may be configured to (i) communicate with the FDT frame application based on one or more messaging protocols defined by the first set of specifications, and (ii) communicate with the FDT frame application, to enable through the FDT frame application, display of the one or more user interface controls implemented by the DTM user interface controller.

The DTM framework controller may be implemented based on a second runtime environment that is different from the first runtime environment.

Further, the DTM user interface controller may be implemented based on the second runtime environment, and based on a second set of specifications that defines a second set of operating capabilities for the FDT frame application, wherein the second set of operating capabilities for the FDT frame application is different from the first set of operating capabilities for the FDT frame application.

In a method embodiment, the DTM wrapper communicates to one or both of the DTM user interface controller and the DTM framework controller, one or more user initiated instructions corresponding to the one or more user interface controls that are implemented by the DTM user interface controller and displayed through the FDT frame application.

The DTM wrapper may receive from the DTM user interface controller, a pointer to a memory address at which the DTM user interface controller has stored display data corresponding to the one or more user interface controls for controlling the field device, wherein the said one or more user interface controls have been generated by the user interface controller that is operating within the second runtime environment, and are received by the DTM wrapper that is operating within the first runtime environment.

In a particular embodiment, the DTM wrapper transmits to the FDT frame application, the stored display data retrieved from the memory address, for display on a display device.

In one embodiment of the method, the second set of operating capabilities for the FDT frame application includes one or more operating capabilities that are not included in the first set of operating capabilities for the FDT frame application. The second runtime environment may be configured to support one or more Hyper Text Markup Language (HTML) controls that are not supported by the first runtime environment.

In a specific method embodiment, the DTM user interface controller is implemented within a process instantiated by the DTM framework controller.

In a further embodiment, the DTM user interface controller may be instantiated by the DTM framework controller in response to the DTM wrapper requesting the DTM framework controller for display data corresponding to the one or more user interface controls for controlling the field device.

The invention additionally includes a computer program product for controlling a field device, through a processor implemented system comprising (i) a device type manager (DTM) configured to control a field device based on control instructions received from a field device tool (FDT) frame application, and (ii) field device tool (FDT) frame application, configured for receiving data from the field device through the DTM, and for transmitting control instructions to the DTM for controlling the field device, the computer program product comprising a non-transitory computer usable medium having a computer readable program code embodied therein. The computer readable program code comprises instructions for implementing within a processor based DTM wrapper within the DTM, the steps of (i) communicating through inter-process communication, with a DTM framework controller configured to implement the communication and control instructions that enable the DTM to communicate with or control the field device, and (ii) communicating through inter-process communication with a DTM user interface controller configured to implement one or more user interface controls for controlling the field device.

The FDT frame application may be implemented based on a first runtime environment, and based on a first set of specifications that defines a first set of operating capabilities for the FDT frame application. The DTM wrapper may be implemented based on the first runtime environment, and may be configured to (i) communicate with the FDT frame application based on one or more messaging protocols defined by the first set of specifications, and (ii) communicate with the FDT frame application, to enable through the FDT frame application, display of the one or more user interface controls implemented by the DTM user interface controller.

The DTM framework controller may be implemented based on a second runtime environment that is different from the first runtime environment.

Further, the DTM user interface controller may be implemented based on the second runtime environment, and based on a second set of specifications that defines a second set of operating capabilities for the FDT frame application, wherein the second set of operating capabilities for the FDT frame application is different from the first set of operating capabilities for the FDT frame application.

BRIEF DESCRIPTION OF THE ACCOMPANYING DRAWINGS

DETAILED DESCRIPTION

The invention provides systems, methods and computer program products that enable a device type manager (DTM) to implement through a field device tool (FDT) frame application, field device management capabilities that are outside the defined operating capabilities of the FDT frame application.

Figure 1:
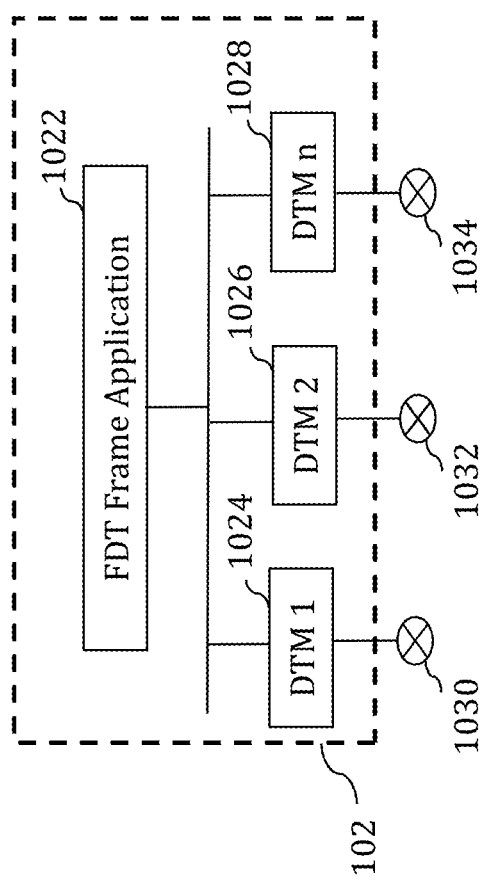
FIG. 1 illustrates a system architecture configured for managing one or more field devices through an FDT frame application and one or more DTMs.

FIG. 1 illustrates an exemplary system architecture 102 configured for managing one or more field devices 1030, 1032, 1034 through a FDT frame application 1022 and one or more device type managers (DTMs 1 to n) 1024, 1026, 1028.

FDT frame application 1022 implements FDT-compliant interfaces for the one or more DTMs 1024, 1026, 1030 to enable management of a variety of field device types, operating under a variety of protocols. The FDT frame application 1022 and DTMs 1024, 1026, 1028, when combined, provide a set of graphical user interfaces (GUIs) that abstract specific implementation details of particular systems and devices—thereby rendering differences between their associated protocols transparent to higher level applications built on top of the FDT architecture. Examples of such abstracted implementation details include: physical interfaces connecting to devices, persistent data storage, system management, and locations and types for device parameters.

The DTMs 1024, 1026, 1028, are configured as drivers for management of their respective field devices 1030, 1032, 1034. Device-specific DTMs encapsulate the device-specific data and functions such as the device structure, its communication capabilities, and internal dependencies. DTMs 1024, 1026, 1028 may also specify a graphic interface for presenting, for example, a configuration interface for an associated field device. DTMs 1024, 1026, 1028 provide a standardized set of interfaces to device data within their respectively coupled field devices 1030, 1032, 1034. DTMs 1024, 1026, 1028 may be configured to enable one or more of visualization of a device status, analysis, calibration, diagnostics, and data access with regard to field devices 1030, 1032, 1034 with which the DTMs 1024, 1026, 1028 are respectively associated.

DTMs 1024, 1026, 1028 plug into the FDT frame application 1022 and are configured to serve as an interface between the FDT frame application 1022 and field devices 1030, 1032, 1034. In an embodiment, DTMs 1024, 1026, 1028 may be configured to communicate with their associated devices 1030, 1032, 1034 through standardized interface methods supported by communication DTMs (not shown) that are positioned as communication intermediates between DTMs 1024, 1026, 1028 and their associated devices 1030, 1032, 1034.

Figure 2:
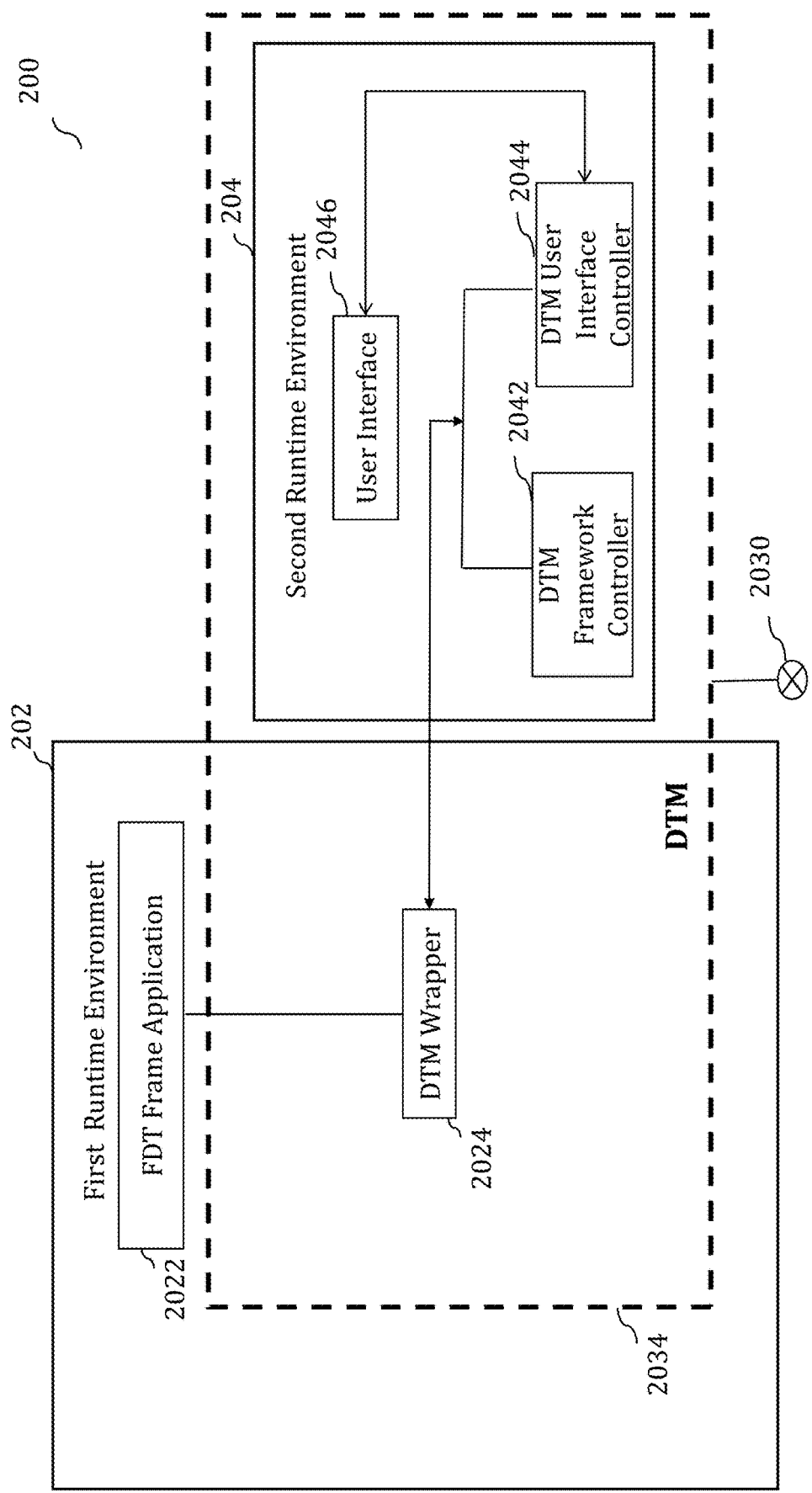
FIG. 2 illustrates an embodiment of a system configured for managing a field device through an FDT frame application and a DTM, in accordance with the teachings of the present invention.

FIG. 2 illustrates an embodiment of a system 200 configured for managing a field device 2030 through an FDT frame application 2022 and a DTM 2034, in accordance with the teachings of the present invention.

FDT frame application 2022 is configured for receiving data from field device 2030 through DTM 2034, and for transmitting control or management instructions to DTM 2034 for controlling field device 2030. DTM 2034 is in turn configured to control field device 2030 based on management or control instructions received from FDT frame application 2022.

In particular, system 200 is configured to enable the FDT frame application 2022—which has been configured based on a first set of specifications (which first set of specifications defines a first set of operating capabilities for the FDT frame application 2022)—to implement for the purposes of managing field device 2030, one or more field device management capabilities that are outside of the first set of operating capabilities defined for FDT frame application 2022 by the first set of specifications.

FDT frame application 2022 is additionally configured for implementation based on or within a first runtime environment 202, and is configured based on (or by) a first set of specifications that defines a first set of operating capabilities corresponding to FDT frame application 2022. In an embodiment of the invention, first runtime environment 202 is a runtime environment based on a first version of common language runtime (CLR)—which is the virtual machine component of Microsoft's .NET framework, and which manages the execution of .NET programs. In a particular embodiment, the first version of CLR is CLR 2.

In an embodiment, DTM 2034 may also be configured such that one or more components of DTM 2034 are configured for implementation based on or within first runtime environment 202, and may further be configured based on (or by) the first set of specifications that define the first set of operating capabilities corresponding to FDT frame application 2022. In a particular embodiment, DTM 2034 may be configured such that (i) one or more components of DTM 2034 are configured for implementation based on or for hosting within first runtime environment 202, and may further be configured based on (or by) the first set of specifications that define the first set of operating capabilities corresponding to FDT frame application 2022, and (ii) one or more other components of DTM 2034 are configured for implementation based on or within a second runtime environment 204, that is different from the first runtime environment 202—and which second runtime environment 204 has or provides one or more operating environment capabilities or properties or parameters that are not provided by first runtime environment 202.

In a particular embodiment, DTM 2034 may comprise a DTM wrapper 2024—wherein DTM wrapper 2024 is a processor implemented component, process or process thread configured to implement one or more of the field device control or management functionalities of DTM 2034. In an embodiment, DTM wrapper 2024 may be configured for implementation based on or within first runtime environment 202, and may further be configured based on (or by) the first set of specifications that define the first set of operating capabilities corresponding to FDT frame application 2022. In a more particular embodiment, DTM 2034 is configured to implement or host therewithin, DTM wrapper 2024, and one or more of a second runtime environment 204, DTM framework controller 2042, DTM user interface controller 2044, and user interface 2046—the configuration and functionality whereof are described elsewhere in this specification.

The first set of specifications may in an embodiment comprise a first version of an FDT specification. In a particular embodiment, the first version of the FDT specification is version 1.2.x of the FDT specification. In an embodiment of the invention, either one or both of the first runtime environment 202 or the first set of specifications that define FDT frame application 2022, do not support HTML controls for a user interface.

FDT frame application 2022 and one or both of DTM 2034 and DTM wrapper 2024 may be configured such that they communicate with each other based on one or more messaging protocols defined by or identified within the first set of specifications.

DTM wrapper 2024 is additionally configured to communicate through inter-process communication(s) with a DTM framework controller 2042 and a DTM user interface controller 2044, an in embodiment DTM framework controller 2042 and DTM user interface 2044 comprise additional components that are implemented within DTM 2034.

DTM framework controller 2042 comprises a processor implemented controller or a processor hosted process or process thread that is configured to implement management, communication, control and/or state change instructions that enable DTM 2034 and/or DTM wrapper 2024 to communicate with or control field device 2030. In an embodiment, DTM framework controller 2042 comprises the managing logic, business logic and/or control logic that enables DTM 2034 and/or DTM wrapper 2024 to manage or control field device 2030. In a more specific embodiment, DTM framework controller 2042 is the managing logic, business logic and/or control logic that enables DTM 2034 and/or DTM wrapper 2024 to manage or control field device 2030.

DTM user interface controller 2044 comprises a processor implemented controller or a processor hosted process or process thread that is configured to implement one or more user interface controls for controlling field device 2030. In an embodiment of the present invention, the user interface controls may comprise graphical user interface (GUI) controls and/or HTML based GUI controls that are generated and configured for display to a user or operator of a FDT frame application (for example, FDT frame application 2022) for the purposes of enabling management or control of a field device (for example, field device 2030).

Each of DTM framework controller 2042 and DTM user interface controller 2044 are implemented based on or within a second runtime environment 204. The second runtime environment 204 is a different runtime environment from the first runtime environment 202—and has or provides one or more operating environment capabilities or properties or parameters that are not provided by first runtime environment 202. In an embodiment of the invention, second runtime environment 204 is a runtime environment based on a second version of common language runtime (CLR)—which is the virtual machine component of Microsoft's .NET framework, and which manages the execution of .NET programs. In a particular embodiment, the second version of CLR is CLR 4.

In particular embodiments of the invention, DTM user interface controller 2044 comprises a processor hosted process or process thread that has been instantiated by DTM framework controller 2042 or by DTM 2034 or by DTM wrapper 2024, or by a process implemented therewithin. In a more particular embodiment, DTM user interface controller 2044 comprises a processor hosted process or process thread that has been instantiated by DTM framework controller 2042 in response to DTM wrapper 2024 transmitting to DTM framework controller 2042, a request for display data corresponding to one or more user interface controls for controlling field device 2030.

Additionally, at least DTM user interface controller 2044, and optionally DTM framework controller 2042 are configured based on (or by) a second set of specifications that defines a second set of operating capabilities corresponding to FDT frame application 2022. The second set of specifications may in an embodiment comprise a second version of an FDT specification. The second set of specifications may in an embodiment comprise a second version of an FDT specification. In a particular embodiment, the second version of the FDT specification is version 2.x of the FDT specification. The second set of operating capabilities for an FDT frame application that are based on or defined by the second set of specifications is in an embodiment, different from the first set of operating capabilities for the FDT frame application 2022 that are based on or defined by the first set of specifications.

In an embodiment of the invention, either one or both of the second runtime environment 204 or the second set of specifications are configured to support or enable HTML user interface controls for a user interface (which HTML user interface controls are in an embodiment, not supported or enabled by first runtime environment 202).

As discussed above, DTM user interface controller 2044 comprises a processor implemented controller or a processor hosted process or a process thread that is configured to implement one or more user interface controls for controlling field device 2030. Accordingly, DTM user interface controller 2044 may be operated to generate or host (for example within a process or process thread controlled by DTM user interface controller 2044) a user interface 2046 (for example a graphical user interface) comprising one or more user interface controls that are intended to be displayed to a user or operator through a display that is communicatively coupled with FDT frame application 2022. Thereafter, display information corresponding to the user interface 2046 or one or more user interface controls within said user interface 2046 are passed from DTM user interface controller 2044 to DTM wrapper 2024—for example by way of one or more inter-process communications.

DTM wrapper 2024 in turn transmits or otherwise communicates to FDT frame application 2022, the display information received from DTM user interface controller 2044 (i.e. the display information corresponding to user interface 2046 or one or more user interface controls within user interface 2046)—whereafter, FDT frame application 2022 uses the received display information for displaying the user interface 2046 or the one or more user interface controls within user interface 2046 on the display that is communicatively coupled with FDT frame application 2022.

It would be understood that (i) since at least DTM user interface controller 2044 and optionally DTM framework controller 2042 are implemented based on a second set of specifications that provide to an FDT frame application, a second set of operating capabilities that are different from the first set of operating capabilities associated with the first set of specifications based on which FDT frame application 2022 and DTM 2034 and/or DTM wrapper 2024 are implemented, and (ii) since both DTM user interface controller 2044 and DTM framework controller 2042 are implemented based on or within second runtime environment 204 which provides one or more operating environment capabilities that are different from the operating environment capabilities provided by first run time environment 202 within which FDT frame application 2022 and DTM 2034 and/or DTM wrapper 2024 are implemented—the architecture of FIG. 2 (which relies on a dual set of FDT specifications and dual runtime environments) ensures that an operator or user can through FDT frame application 2022 (*i*) receive, view or interface with one or more user interface controls (generated within user interface 2046 by DTM user interface controller 2044) that are not provided by or supported by either or both of the first set of specifications that have been used to define the operating capabilities of the FDT frame application 2022 and DTM 2034 and/or DTM wrapper 2024, and the first runtime environment 202 within which FDT frame application 2022 and DTM 2034 and/or DTM wrapper 2024 are being executed or implemented, and/or (ii) exploit one or more field device management capabilities (provided by DTM framework controller 2042), that are not provided by or supported by either or both of the first set of specifications that have been used to define the operating capabilities of the FDT frame application 2022 and DTM 2034 and/or DTM wrapper 2024, and the first runtime environment within which FDT frame application 2022 and DTM 2034 and/or DTM wrapper 2024 are being executed or implemented.

In an embodiment of the invention illustrated in FIG. 2, DTM wrapper 2024 is configured to transmit to DTM user interface controller 2044, one or more user initiated instructions corresponding to the one or more user interface controls that are implemented by the DTM user interface controller 2044 within user interface 2046, and which user interface controls have been displayed on a display device through FDT frame application 2022 according to the discussion above. It would be understood that the user initiated instructions may be received at FDT frame application 2022 through an I/O controller (input-output controller) within a computing device that hosts FDT frame application 2022—and these instructions may be transmitted from FDT frame application 2022 to DTM user interface controller 2044 (in an embodiment, this transmission may be achieved through DTM wrapper 2024 as a transmission intermediary), and optionally may be transmitted to DTM user interface controller 2044 along with information identifying specific user interface controls in respect of which the user initiated instructions have been received.

DTM user interface controller 2044 may be configured to use the received user initiated instructions, and optionally, the information identifying specific user interface controls in respect of which the user initiated instructions have been received, for the purposes of updating the user interface 2046 based on said user initiated instructions. It would be understood that display information corresponding to the updated user interface 2046 may thereafter be communicated back to FDT frame application 2022 for display to the user, in the manner already described above.

DTM wrapper 2024 may additionally or alternately be configured to transmit to DTM framework controller 2042, one or more user initiated instructions corresponding to the one or more user interface controls that are implemented by the DTM user interface controller 2044 within user interface 2046, and which user interface controls have been displayed on a display device through FDT frame application 2022 according to the discussion above. Said transmission may optionally include information identifying the specific user interface controls in respect of which the user initiated instructions have been received. DTM framework controller 2042 may be configured to use the received user initiated instructions and optionally the information identifying the specific user interface controls in respect of which the user initiated instructions have been received, for the purposes of communicating with, controlling, managing or changing state of field device 2030.

In a particular embodiment of the invention, DTM user interface controller 2044 is configured to transmit to DTM wrapper 2024, display information corresponding to the user interface 2046 or one or more user interface controls within said user interface 2046, by sharing a memory address or a pointer to a memory address at which the DTM user interface controller 2044 has stored display data corresponding to the one or more user interface controls within user interface 2046.

DTM wrapper 2024 may additionally be configured to receive the memory address or pointer to the memory address, and to transmit to FDT frame application 2022, the stored display information (corresponding to user interface 2046 or one or more user interface controls within said user interface 2046) retrieved from the shared memory address, and which display information is used by FDT frame application 2022 for display on a display device. In an embodiment of the invention, FDT frame application 2022 assigns a portion of the display for displaying the display information corresponding to user interface 2046 or the one or more user interface controls within user interface 2046 that is retrieved from the memory addresses shared by DTM user interface controller 2044—and any changes to the user interface 2046 or the user interface controls that are updated by way of subsequent memory address shares by DTM user interface controller 2044 are updated on this portion of the display that has been assigned by FDT frame application 2022 for this purpose.

Figure 3:
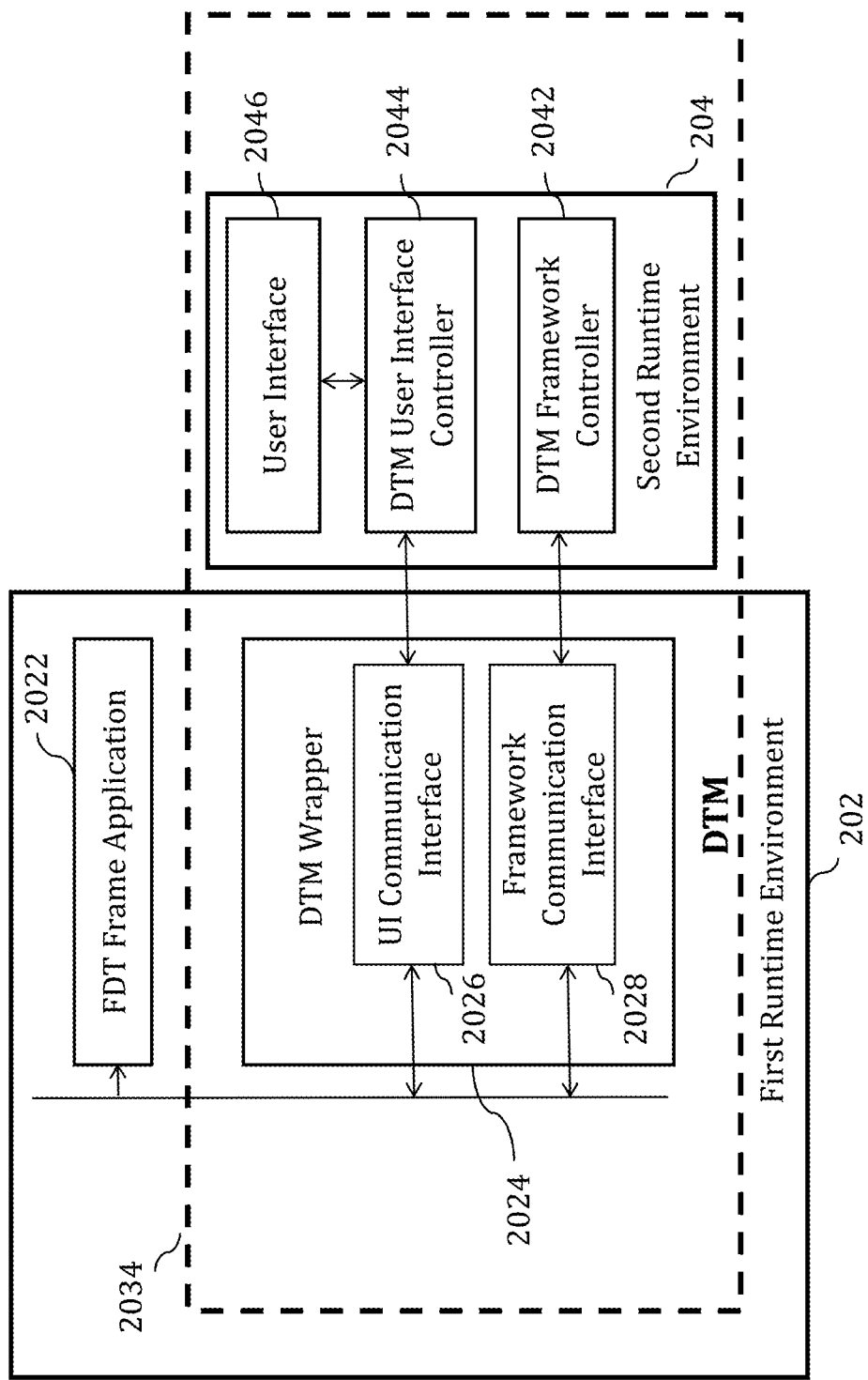
FIG. 3 illustrates in more detail, particular components of the system of FIG. 2.

FIG. 3 illustrates in more detail, DTM 2034 of system 200, that has been discussed in connection with FIG. 2.

As shown in FIG. 3, DTM 2034 comprises DTM wrapper 2024 operating within first runtime environment 202—and DTM wrapper 2024 in turn comprises a UI communication interface 2026 and a framework communication interface 2028. UI communication interface 2026 is configured for communication with DTM user interface controller 2044 within second runtime environment 204 to invoke or request or instantiate functionality of DTM user interface controller 2044. Framework communication interface 2028 is configured for communication with DTM framework controller 2042 within second runtime environment 204 to invoke or request or instantiate functionality of DTM framework controller 2042. In an embodiment (i) UI communication interface 2026 and DTM user interface controller 2044 are configured to communicate with each other through inter-process communications, and/or (ii) framework communication interface 2028 and DTM framework controller 2042 are configured to communicate with each other through inter-process communications. Each of UI communication interface 2026 and framework communication interface 2028 may be directly or indirectly communicably coupled with FDT frame application 2022 to transmit or receive communications to or from FDT frame application 2022.

In specific embodiments, either or both of UI communication interface 2026 and framework communication interface 2028 comprise a processor implemented controller or a processor hosted process or process thread configured or instantiated for providing the above described functionality.

In a particular embodiment, UI communication interface 2026 includes or is communicably coupled with a memory or data repository configured to store display information corresponding to user interface 2046 or one or more user interface controls within said user interface 2046 that are passed from DTM user interface controller 2044 to DTM wrapper 2024. In a more specific embodiment, UI communication interface 2026 includes or is communicably coupled with a memory or data repository configured to store a memory address or a pointer to a memory address at which the DTM user interface controller 2044 has stored display data corresponding to one or more user interface controls within user interface 2046. UI communication interface 2026 may be configured to transmit to FDT frame application 2022, the stored display information (corresponding to user interface 2046 or one or more user interface controls within said user interface 2046) received from DTM user interface controller 2044 and stored in the above discussed memory or data repository, which display information is used by FDT frame application 2022 for display on a display device.

Figure 4:
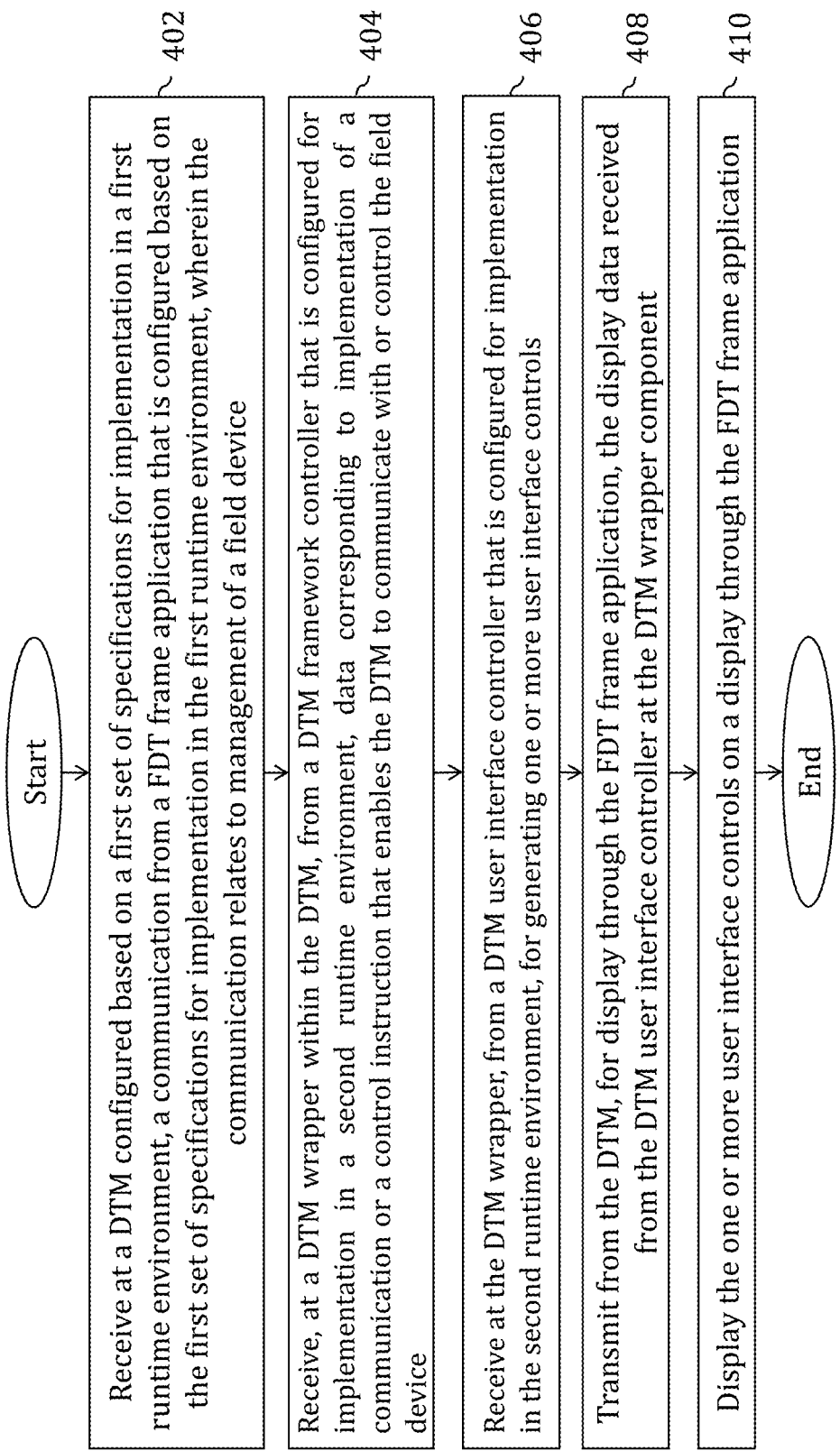
FIG. 4 is a flow chart illustrating a method of managing one or more field devices through an FDT frame application and a DTM, in accordance with the teachings of the present invention.

FIG. 4 is a flow chart illustrating a method of managing one or more field devices through an FDT frame application and a DTM, in accordance with the teachings of the present invention. For the purposes of the below description it would be understood that the method may be implemented within system 200 configured in accordance with the preceding description.

Step 402 comprises receiving at DTM 2034 a communication or message from an FDT frame application 2022, wherein the received communication or message relates to management of a field device 2030. DTM 2034 includes DTM wrapper 2024. DTM 2034 and/or DTM wrapper 2024 is/are configured based on a first set of specifications for implementation in a first runtime environment 202. The FDT frame application 2022 is also configured based on the first set of specifications, and for implementation in the first runtime environment 202. In an embodiment, the received communication relates to retrieval of data from, or control of, or modification of state of, field device 2030.

Step 404 comprises receiving from DTM framework controller 2042, data or information or an instruction corresponding to implementation of a management, communication, control or state change instruction, which data or information or instruction enables the DTM 2034 and/or DTM wrapper 2024 to communicate with, manage, control or effect a state change in field device 2030. In an embodiment of step 404, the data, information or instruction may be received at DTM wrapper 2024.

Step 406 comprises receiving from a DTM user interface controller 2044, display data corresponding to one or more user interface controls for controlling field device 2030. DTM user interface controller 2044 may be configured for implementation within a second runtime environment 204, and may be configured for implementing the one or more user interface controls for controlling the field device, within a user interface 2046 hosted within the second runtime environment 204. In an embodiment, the display data at step 406 may be received at DTM wrapper 2024.

Step 408 comprises transmitting for display to the FDT frame application 2022, the display data received from the DTM user interface controller. The display data at step 408 may in an embodiment be transmitted from DTM 2034 to FDT frame application 2022, and in a more specific embodiment from DTM wrapper 2024 to FDT frame application 2022.

Step 410 comprises displaying the one or more user interface controls (to which the transmitted display data corresponds) on a display. Said display may be implemented by FDT frame application 2022, which is communicatively coupled with the display.

For the purposes of the method of FIG. 4, it would be understood that:

The FDT frame application 2022 and one or both of DTM 2034 and/or DTM wrapper 2024 are configured based on (or by) a first runtime environment 202, and are further configured based on (or by) a first set of specifications that defines a first set of operating capabilities corresponding to FDT frame application 2022. First runtime environment may comprise a runtime environment based on a first version of CLR—and in a particular embodiment, the first version of CLR is CLR 2. The first set of specifications may in an embodiment comprise a first version of an FDT specification. In a particular embodiment, the first version of the FDT specification is version 1.2.x of the FDT specification. In an embodiment of the invention, either one or both of the first runtime environment or the first set of specifications that define FDT frame application 2022 do not support HTML controls for a user interface.

Each of DTM framework controller 2042 and DTM user interface controller 2044 may be implemented within or instantiated by DTM 2034 and further, are implemented based on or within a second runtime environment 204. The second runtime environment 204 is a different runtime environment from the first runtime environment 202—and provides one or more operating environment capabilities that are not provided by first runtime environment 204. In an embodiment of the invention, second runtime environment is a runtime environment based on a second version of CLR. In a particular embodiment, the second version of CLR is CLR 4. Additionally, at least DTM user interface controller 2044, and optionally DTM framework controller 2042 are configured based on (or by) a second set of specifications that defines a second set of operating capabilities corresponding to FDT frame application 2022. The second set of specifications may in an embodiment comprise a second version of an FDT specification. The second set of specifications may in an embodiment comprise a second version of an FDT specification. In a particular embodiment, the second version of the FDT specification is version 2.x of the FDT specification. The second set of operating capabilities for the FDT frame application that are based on or defined by the second set of specifications is in an embodiment, different from the first set of operating capabilities for the FDT frame application that are based on or defined by the first set of specifications.

In an embodiment of the method, either one or both of the second runtime environment or the second set of specifications are configured to support or enable HTML controls for a user interface (which HTML controls are in an embodiment, not supported or enabled by the first runtime environment).

Figure 5:
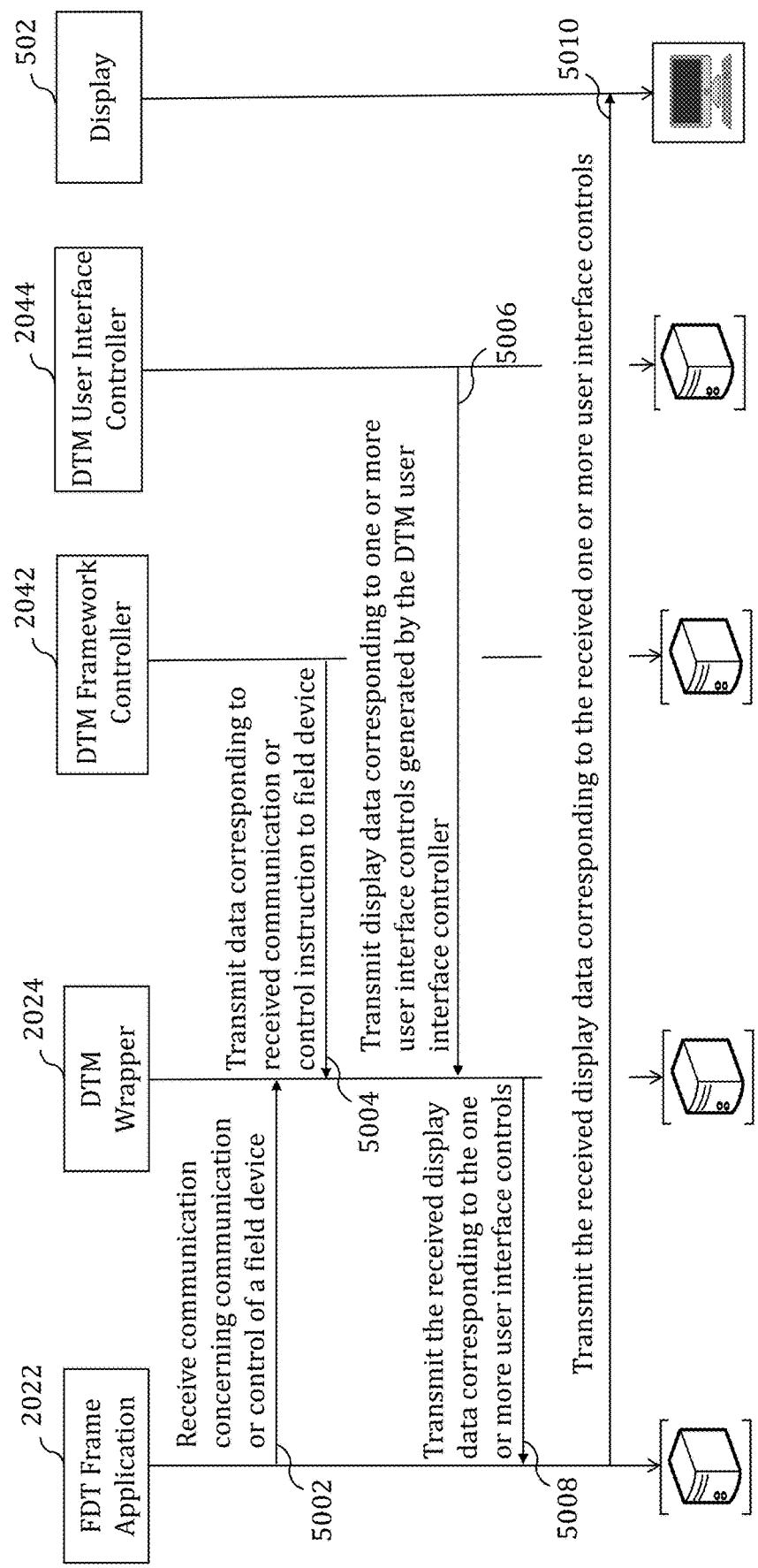
FIG. 5 illustrates communication flow between entities within a system configured for implementing a method of managing one or more field devices through an FDT frame application and a DTM, in accordance with the teachings of the present invention.

FIG. 5 illustrates a communication flow between entities within system environment 200, for implementing the method of managing one or more field devices through an FDT frame application 2022 and a DTM wrapper 2024 (within DTM 2034), that is more generally discussed in connection with FIG. 4 above.

Step 5002 comprises transmitting from FDT frame application 2022 to DTM wrapper 2024, a communication or message concerning management of a field device. The DTM wrapper 2024 is configured based on a first set of specifications for implementation in a first runtime environment 202. The FDT frame application 2022 is also configured based on the first set of specifications, and for implementation in the first runtime environment 202. In an embodiment, the transmitted communication relates to retrieval of data from, or control of, or modification of state, of a field device 2030.

Step 5004 comprises transmitting from DTM framework controller 2042 to DTM wrapper 2024, data corresponding to implementation of a communication or a control instruction that enables DTM wrapper 2024 and/or a DTM 2034 (within which DTM wrapper 2024 has been implemented) to communicate with or control the field device 2030. In an embodiment, the communication or control instruction seeks to implement the objective of the communication or message concerning management of the field device 2030 that has been transmitted from FDT frame application 2022 to DTM wrapper 2024 at step 5002. The DTM framework controller 2042 is configured based on a second set of specifications for implementation in a second runtime environment 204. In an embodiment, the transmitted communication relates to retrieval of data from, or control of, or modification of state of, field device 2030.

Step 5006 comprises transmitting from DTM user interface controller 2044 to DTM wrapper 2024, display data corresponding to one or more user interface controls for controlling field device 2030. DTM user interface controller 2044 may be configured for implementation within the second runtime environment 204, and may be configured for implementing the one or more user interface controls for controlling the field device 2030, within a user interface 2046 hosted within the second runtime environment 204.

Step 5008 comprises transmitting from DTM wrapper 2024 to FDT frame application 2022, the display data received from the DTM user interface controller 2044 at step 5006—which display data corresponds to the one or more user interface controls for controlling field device 2030 that has been generated and are hosted within the second runtime environment.

Step 5010 comprises transmitting from FDT frame application 2022 to a display 502 that is communicatively coupled with FDT frame application 2022, the display data that has been received at step 5008 and that corresponds to the one or more user interface controls for controlling field device 2030. The display data is transmitted to display 502 for the purpose of displaying the one or more user interface controls to a user or operator.

For the purposes of the communication flow diagram of FIG. 5, it would be understood that:

The FDT frame application 2022 and DTM wrapper 2024 are configured based on (or by) a first runtime environment 202, and are further configured based on (or by) a first set of specifications that defines a first set of operating capabilities corresponding to FDT frame application 2022. First runtime environment may comprise a runtime environment based on a first version of CLR—and in a particular embodiment, the first version of CLR is CLR 2. The first set of specifications may in an embodiment comprise a first version of an FDT specification. In a particular embodiment, the first version of the FDT specification is version 1.2.x of the FDT specification. In an embodiment of the invention, either one or both of the first runtime environment or the first set of specifications that define FDT frame application 2022 do not support HTML controls for a user interface.

Each of DTM framework controller 2042 and DTM user interface controller 2044 are implemented based on or within a second runtime environment 204. The second runtime environment 204 is a different runtime environment from the first runtime environment 202—and provides one or more operating environment capabilities that are not provided by first runtime environment 204. In an embodiment of the invention, second runtime environment is a runtime environment based on a second version of CLR. In a particular embodiment, the second version of CLR is CLR 4. Additionally, at least DTM user interface controller 2044, and optionally DTM framework controller 2042 are configured based on (or by) a second set of specifications that defines a second set of operating capabilities corresponding to FDT frame application 2022. The second set of specifications may in an embodiment comprise a second version of an FDT specification. The second set of specifications may in an embodiment comprise a second version of an FDT specification. In a particular embodiment, the second version of the FDT specification is version 2.x of the FDT specification. The second set of operating capabilities for the FDT frame application that are based on or defined by the second set of specifications is in an embodiment, different from the first set of operating capabilities for the FDT frame application that are based on or defined by the first set of specifications.

In an embodiment of the method, either one or both of the second runtime environment or the second set of specifications are configured to support or enable HTML controls for a user interface (which HTML controls are in an embodiment, not supported or enabled by the first runtime environment).

Figure 6:
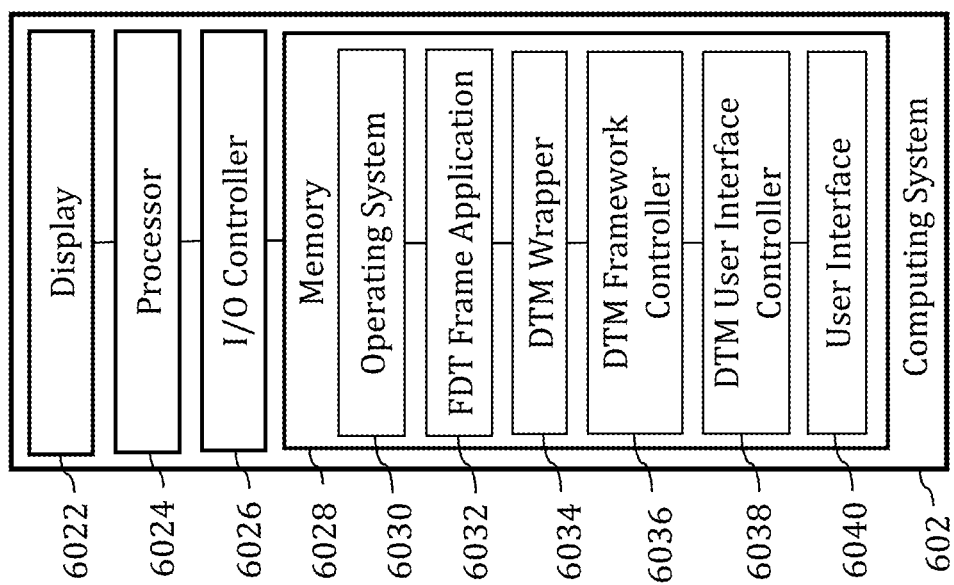
FIG. 6 illustrates a computing system configured to implement the methods of the present invention.

FIG. 6 illustrates a computing system 602 that is configured to implement the methods of the present invention.

Computing system 602 comprises a display 6022, a processor 6024, an input-output (I/O) controller 6026, and memory 6028, which memory 6028 may include transitory memory and/or non-transitory memory. In an exemplary embodiment, memory 6028 may have stored therewithin, (i) an operating system 6030 configured for managing device hardware and software resources and that provides common services for software programs implemented within computing system 602, (ii) FDT frame application 6032, (iii) DTM wrapper 6034, (iv) DTM framework controller 6036, (v) DTM user interface controller 6038 and (vi) a user interface 6040 that is controlled by DTM user interface controller 6038. It would be understood that each or any of FDT frame application 6032, DTM wrapper 6034, DTM framework controller 6036, DTM user interface controller 6038 and user interface 6040 may be configured in accordance with any of the invention embodiments discussed above in connection with FIGS. 2 to 5. In an embodiment, one or more of, and preferably all of (ii) DTM wrapper 6034, (ii) DTM framework controller 6036, (iii) DTM user interface controller 6038 and (iv) user interface 6040 may be implemented within a DTM 2034 of the type illustrated in FIGS. 2 and 3.

Additionally, for the purposes of the computing system of FIG. 6, it would be understood that:

The FDT frame application 6032 and DTM wrapper 6034 are configured based on (or by) a first runtime environment, and are further configured based on (or by) a first set of specifications that defines a first set of operating capabilities corresponding to FDT frame application 6032. First runtime environment may comprise a runtime environment based on a first version of CLR—and in a particular embodiment, the first version of CLR is CLR 2. The first set of specifications may in an embodiment comprise a first version of an FDT specification. In a particular embodiment, the first version of the FDT specification is version 1.2.x of the FDT specification. In an embodiment of the invention, either one or both of the first runtime environment or the first set of specifications that define FDT frame application 6032 do not support HTML controls for a user interface.

Each of DTM framework controller 6036 and DTM user interface controller 6038 are implemented based on or within a second runtime environment. The second runtime environment is a different runtime environment from the first runtime environment—and provides one or more operating environment capabilities that are not provided by the first runtime environment. In an embodiment of the invention, the second runtime environment is a runtime environment based on a second version of CLR. In a particular embodiment, the second version of CLR is CLR 4. Additionally, at least DTM user interface controller 6038, and optionally DTM framework controller 6036 are configured based on (or by) a second set of specifications that defines a second set of operating capabilities corresponding to FDT frame application 6032. The second set of specifications may in an embodiment comprise a second version of an FDT specification. In a particular embodiment, the second version of the FDT specification is version 2.x of the FDT specification. The second set of operating capabilities for the FDT frame application 6032 that are based on or defined by the second set of specifications is in an embodiment, different from the first set of operating capabilities for the FDT frame application 6032 that are based on or defined by the first set of specifications.

In an embodiment of the method, either one or both of the second runtime environment or the second set of specifications are configured to support or enable HTML controls for a user interface (which HTML controls are in an embodiment, not supported or enabled by the first runtime environment).

Figure 7:
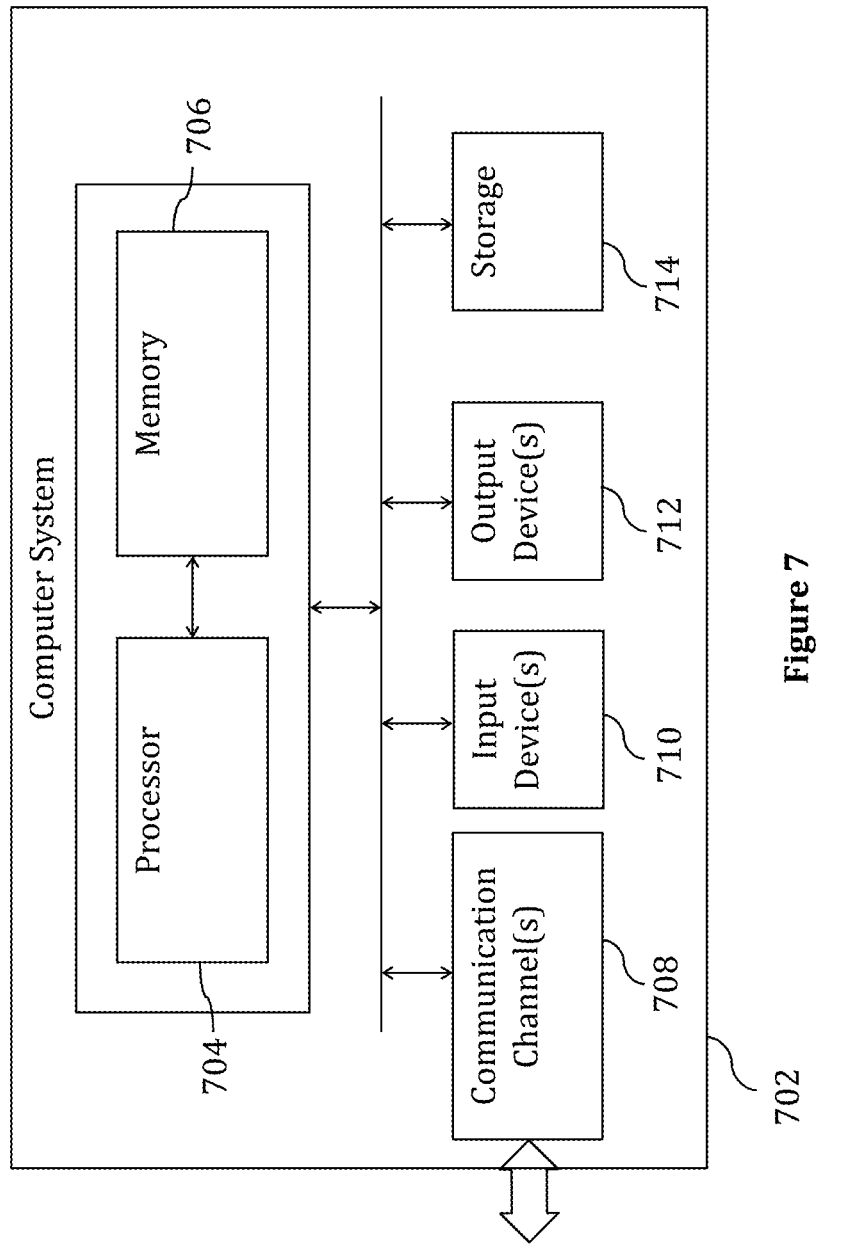
FIG. 7 illustrates an exemplary computer system according to which various embodiments of the present invention may be implemented.

FIG. 7 illustrates an exemplary computer system 702 according to which various embodiments of the present invention may be implemented.

Computer system 702 comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various software(s) executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above described systems and methods, it would be apparent that the present invention provides improved systems, methods and computer program products that enable a field device tool frame application to implement through a device type manager, field device management capabilities that are outside the defined operating capabilities of the field device tool frame application.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:
1. A system for controlling a field device, comprising:
a processor;
a device type manager (DTM) configured to control a field device based on control instructions received from a field device tool (FDT) frame application; and
a processor implemented field device tool (FDT) frame application, configured for receiving data from the field device through the DTM, and for transmitting control instructions to the DTM for controlling the field device; and
wherein:
the FDT frame application is configured:
for implementation based on a first runtime environment; and
based on a first set of specifications that defines a first set of operating capabilities for the FDT frame application; and
the DTM comprises a DTM wrapper configured:
for implementation based on the first runtime environment;
to communicate with the FDT frame application based on one or more messaging protocols defined by the first set of specifications;
to communicate through inter-process communication, with:
a DTM framework controller configured to implement the communication and control instructions that enable the DTM to communicate with or control the field device, wherein the DTM framework controller is configured for implementation based on a second runtime environment that is different from the first runtime environment; and
a DTM user interface controller configured to implement one or more user interface controls for controlling the field device, wherein the DTM user interface controller is configured:
for implementation based on the second runtime environment; and
based on a second set of specifications that defines a second set of operating capabilities for the FDT frame application, wherein the second set of operating capabilities for the FDT frame application is different from the first set of operating capabilities for the FDT frame application;
to communicate with the FDT frame application, to enable through the FDT frame application, display of the one or more user interface controls implemented by the DTM user interface controller.
2. The system as claimed in claim 1, wherein the DTM wrapper is configured to communicate to one or both of the DTM user interface controller and the DTM framework controller, one or more user initiated instructions corresponding to the one or more user interface controls that are implemented by the DTM user interface controller and displayed through the FDT frame application.

3. The system as claimed in claim 1, wherein the DTM wrapper is configured to receive from the DTM user interface controller, a pointer to a memory address at which the DTM user interface controller has stored display data corresponding to the one or more user interface controls for controlling the field device, wherein the said one or more user interface controls have been generated by the user interface controller that is operating within the second runtime environment, and are received by the DTM wrapper that is operating within the first runtime environment.

4. The system as claimed in claim 3, wherein the DTM wrapper is configured to transmit to the FDT frame application, the stored display data retrieved from the memory address, for display on a display device.

5. The system as claimed in claim 1, wherein the second set of operating capabilities for the FDT frame application includes one or more operating capabilities that are not included in the first set of operating capabilities for the FDT frame application.

6. The system as claimed in claim 1, wherein the second runtime environment is configured to support one or more Hyper Text Markup Language (HTML) controls that are not supported by the first runtime environment.

7. The system as claimed in claim 1, wherein the DTM user interface controller is implemented within a process instantiated by the DTM framework controller.

8. The system as claimed in claim 7, wherein the DTM user interface controller is instantiated by the DTM framework controller in response to the DTM wrapper requesting the DTM framework controller for display data corresponding to the one or more user interface controls for controlling the field device.

9. A method for controlling a field device, through a processor implemented system comprising (i) a device type manager (DTM) configured to control a field device based on control instructions received from a field device tool (FDT) frame application, and (ii) field device tool (FDT) frame application, configured for receiving data from the field device through the DTM, and for transmitting control instructions to the DTM for controlling the field device, the method comprising implementing at a DTM wrapper within the DTM, the steps of:
communicating through inter-process communication, with a DTM framework controller configured to implement the communication and control instructions that enable the DTM to communicate with or control the field device;
communicating through inter-process communication with a DTM user interface controller configured to implement one or more user interface controls for controlling the field device;
wherein the FDT frame application is implemented:
based on a first runtime environment; and
based on a first set of specifications that defines a first set of operating capabilities for the FDT frame application; and
wherein the DTM wrapper:
is implemented based on the first runtime environment; and
communicates with the FDT frame application based on one or more messaging protocols defined by the first set of specifications;
communicates with the FDT frame application, to enable through the FDT frame application, display of the one or more user interface controls implemented by the DTM user interface controller;
wherein the DTM framework controller is implemented based on a second runtime environment that is different from the first runtime environment; and
wherein the DTM user interface controller is implemented:
based on the second runtime environment; and
based on a second set of specifications that defines a second set of operating capabilities for the FDT frame application, wherein the second set of operating capabilities for the FDT frame application is different from the first set of operating capabilities for the FDT frame application.

10. The method as claimed in claim 9, wherein the DTM wrapper communicates to one or both of the DTM user interface controller and the DTM framework controller, one or more user initiated instructions corresponding to the one or more user interface controls that are implemented by the DTM user interface controller and displayed through the FDT frame application.

11. The method as claimed in claim 9, wherein the DTM wrapper receives from the DTM user interface controller, a pointer to a memory address at which the DTM user interface controller has stored display data corresponding to the one or more user interface controls for controlling the field device, wherein the said one or more user interface controls have been generated by the user interface controller that is operating within the second runtime environment, and are received by the DTM wrapper that is operating within the first runtime environment.

12. The method as claimed in claim 11, wherein the DTM wrapper transmits to the FDT frame application, the stored display data retrieved from the memory address, for display on a display device.

13. The method as claimed in claim 9, wherein the second set of operating capabilities for the FDT frame application includes one or more operating capabilities that are not included in the first set of operating capabilities for the FDT frame application.

14. The method as claimed in claim 9, wherein the second runtime environment is configured to support one or more Hyper Text Markup Language (HTML) controls that are not supported by the first runtime environment.

15. The method as claimed in claim 9, wherein the DTM user interface controller is implemented within a process instantiated by the DTM framework controller.

16. The method as claimed in claim 15, wherein the DTM user interface controller is instantiated by the DTM framework controller in response to the DTM wrapper requesting the DTM framework controller for display data corresponding to the one or more user interface controls for controlling the field device.

17. A computer program product for controlling a field device, through a processor implemented system comprising (i) a device type manager (DTM) configured to control a field device based on control instructions received from a field device tool (FDT) frame application, and (ii) field device tool (FDT) frame application, configured for receiving data from the field device through the DTM, and for transmitting control instructions to the DTM for controlling the field device, the computer program product comprising a non-transitory computer usable medium having a computer readable program code embodied therein, the computer readable program code comprising instructions for implementing within a processor based DTM wrapper within the DTM, the steps of:

communicating through inter-process communication, with a DTM framework controller configured to implement the communication and control instructions that enable the DTM to communicate with or control the field device;

communicating through inter-process communication with a DTM user interface controller configured to implement one or more user interface controls for controlling the field device;

wherein the FDT frame application is implemented:
  based on a first runtime environment; and
  based on a first set of specifications that defines a first set of operating capabilities for the FDT frame application; and wherein the DTM wrapper:
  is implemented based on the first runtime environment; and
  communicates with the FDT frame application based on one or more messaging protocols defined by the first set of specifications;
  communicates with the FDT frame application, to enable through the FDT frame application, display of the one or more user interface controls implemented by the DTM user interface controller;

wherein the DTM framework controller is implemented based on a second runtime environment that is different from the first runtime environment; and wherein the DTM user interface controller is implemented:
  based on the second runtime environment; and
  based on a second set of specifications that defines a second set of operating capabilities for the FDT frame application, wherein the second set of operating capabilities for the FDT frame application is different from the first set of operating capabilities for the FDT frame application.

* * * * *